United States Patent [19]

Bae

[11] Patent Number: 5,389,974
[45] Date of Patent: Feb. 14, 1995

[54] AUTOMATIC CONVERTING DEVICE OF TELEVISION BROADCASTING MODE

[75] Inventor: Jum H. Bae, Suweon, Rep. of Korea

[73] Assignee: Samsung Electronics Co., Ltd., Kyungki-Do, Rep. of Korea

[21] Appl. No.: 999,111

[22] Filed: Dec. 31, 1992

[30] Foreign Application Priority Data

Dec. 31, 1991 [KR] Rep. of Korea ............... 91-25683

[51] Int. Cl.6 .................................................. H04N 5/46
[52] U.S. Cl. ...................................... 348/555; 348/558; 348/458
[58] Field of Search ................. 358/140, 141, 142, 11, 358/12, 25, 23, 19, 21 R, 21 V, 24, 181, 186, 191.1; H04N 11/20, 11/22, 7/01, 7/04; 348/441, 442, 443, 444, 445, 453, 454, 458, 459

[56] References Cited

U.S. PATENT DOCUMENTS

| | | | |
|---|---|---|---|
| 3,676,585 | 7/1972 | Kaneko et al. | 358/11 |
| 3,751,581 | 8/1973 | Sakata et al. | 358/11 |
| 4,414,563 | 11/1983 | Juhnke et al. | 358/23 |
| 4,574,279 | 3/1986 | Roberts | 348/443 |
| 4,933,749 | 6/1990 | Van Lammeren et al. | 358/23 |
| 5,119,177 | 6/1992 | Lim | 358/11 |
| 5,136,369 | 8/1992 | Bohme et al. | 358/17 |
| 5,192,997 | 3/1993 | Imbert et al. | 358/11 |

FOREIGN PATENT DOCUMENTS

| | | | |
|---|---|---|---|
| 0284266 | 9/1988 | European Pat. Off. | 358/11 |
| 0221588 | 1/1983 | Japan | 358/11 |
| 0141092 | 8/1983 | Japan | 358/11 |

*Primary Examiner*—Victor R. Kostak
*Assistant Examiner*—Michael H. Lee
*Attorney, Agent, or Firm*—Sughrue, Mion, Zinn, Macpeak & Seas

[57] ABSTRACT

An automatic converting device of a television broadcasting mode compatibly converts the standard television broadcasting signals such as NTSC, PAL, SECAM, M-PAL and N-PAL. A video memory able to store two fields is employed for standard television signal conversion without using a large number of the field memories.

8 Claims, 3 Drawing Sheets

AUTOMATIC CONVERTING DEVICE OF TELEVISION BROADCASTING MODE

FIELD OF THE INVENTION

The present invention relates to an automatic switching or converting device of a television broadcasting mode capable of compatibly converting standard television broadcasting signals such as NTSC, PAL, SECAM, M-PAL, N-PAL and the like. The present application is based on the disclosure of Korean Patent Application 91-25683 filed Dec. 31, 1991, which disclosure is incorporated herein by reference.

BACKGROUND OF THE INVENTION

Generally, standard television broadcasting signals well-known hereto include, for example, NTSC, PAL, SECAM, M-PAL and N-PAL. Various techniques have been proposed to convert such television broadcasting signals in order to substantially conform to the characteristics corresponding to the "seeing" and "hearing" areas.

For example, a technique proposed by SONY CO., Ltd, employs several field memories to prevent the picture quality from being deteriorated. However, the construction of a system embodying this technique is very complicated, resulting in a manufacturing prohibitive with a result that a cost is increased undesirably.

Japanese patent laid-open publication No. Heisei 3-208484, for instance, discloses a technique wherein the television broadcasting modes such as NTSC, PAL, SECAM and others, can be compatibly converted. FIG. 1 shows a block diagram of television broadcasting mode converting device embodying the technique disclosed in Heisei 3-208484.

As shown in FIG. 1, the device includes a horizontal scanning line number converting circuit 3 for converting the number of horizontal scanning lines of an input image signal into the number of horizontal scanning lines of a different television broadcasting mode, a field frequency converting circuit 11 for converting a field frequency of an output signal of the horizontal scanning line number converting circuit 3 into a field frequency of a different television mode, and a vertical edge emphasizing circuit 20 disposed at a front stage or rear stage of the horizontal scanning line converting circuit 3 for emphasizing an edge of the image signal in a vertical direction to correct the vertical resolution which has deteriorated due to the change in the number of the horizontal scanning lines. The device further includes an A/D converter 2 for receiving a signal applied at input terminal 1, a D/A converter 15 coupled between converting circuit 11 and output terminal 16, and horizontal and vertical sync. separating circuits 9 and 13, respectively. Such a conventional technique provides a switching device of a television broadcasting mode having a reduced deterioration of an image signal, but doesn't provide the ability of a line or field conversion of the image signal.

SUMMARY OF THE INVENTION

An object of the invention is to provide an automatic converting device of a television broadcasting mode in which video memory practicable to store two field image signals is employed instead of a field memory so as to compatibly convert standard television broadcasting signals by way of a simplified construction and an inexpensive cost.

In order to achieve the above object, the present invention provides an automatic converting device of a television broadcasting mode comprising: a low pass filter for extracting a luminance signal from an input television video signal; an analog to digital converter connected to the low pass filter, for converting the luminance signal into digital signals; a synchronizing signal separator for separating synchronizing signals from the video signal; a color difference signal generator connected to the synchronizing signal separator, for generating color difference signals from the video signals; a synchronizing signal generator connected to the synchronizing signal separator, for supplying a 4 fsc generating signal proper to the broadcasting mode and for generating a synchronizing signal; a multiplexer connected to the color difference signal generator, for mixing the color difference signals; an analog to digital converter connected to the multiplexer, for converting the mixed color difference signal into a digital signal to produce color signal data; a controller for generating various control signals to control the entire system; a luminance line memory connected to the controller, for delaying the luminance signal by 1 horizontal period (1H); a color line memory connected to the controller, for delaying the color signal by 1 horizontal period; a basic clock generator connected to the controller, for generating a basic clock signal; a video memory connected to the controller, for compatibly converting different fields; a digital to analog converter connected to the controller, for converting the image data into an analog luminance signal and color difference signals; an encoder connected to the digital to analog converter, for encoding the broadcasting signal of NTSC, PAL, N-PAL or M-PAL; an encoder connected to the digital to analog converter, for encoding an SECAM broadcasting signal; and a switch connected to the controller and the encoder, for selectively providing any one of the output signals from the encoders under the control of the controller.

BRIEF DESCRIPTION OF THE DRAWINGS

The above and other objects and advantages of the invention will be apparent from the following specification taken in conjunction with the accompanying drawings, in which.

DETAILED DESCRIPTION OF THE PREFERRED EMBODIMENT

A preferred embodiment of the present invention will now be described in more detail.

Figure 1:
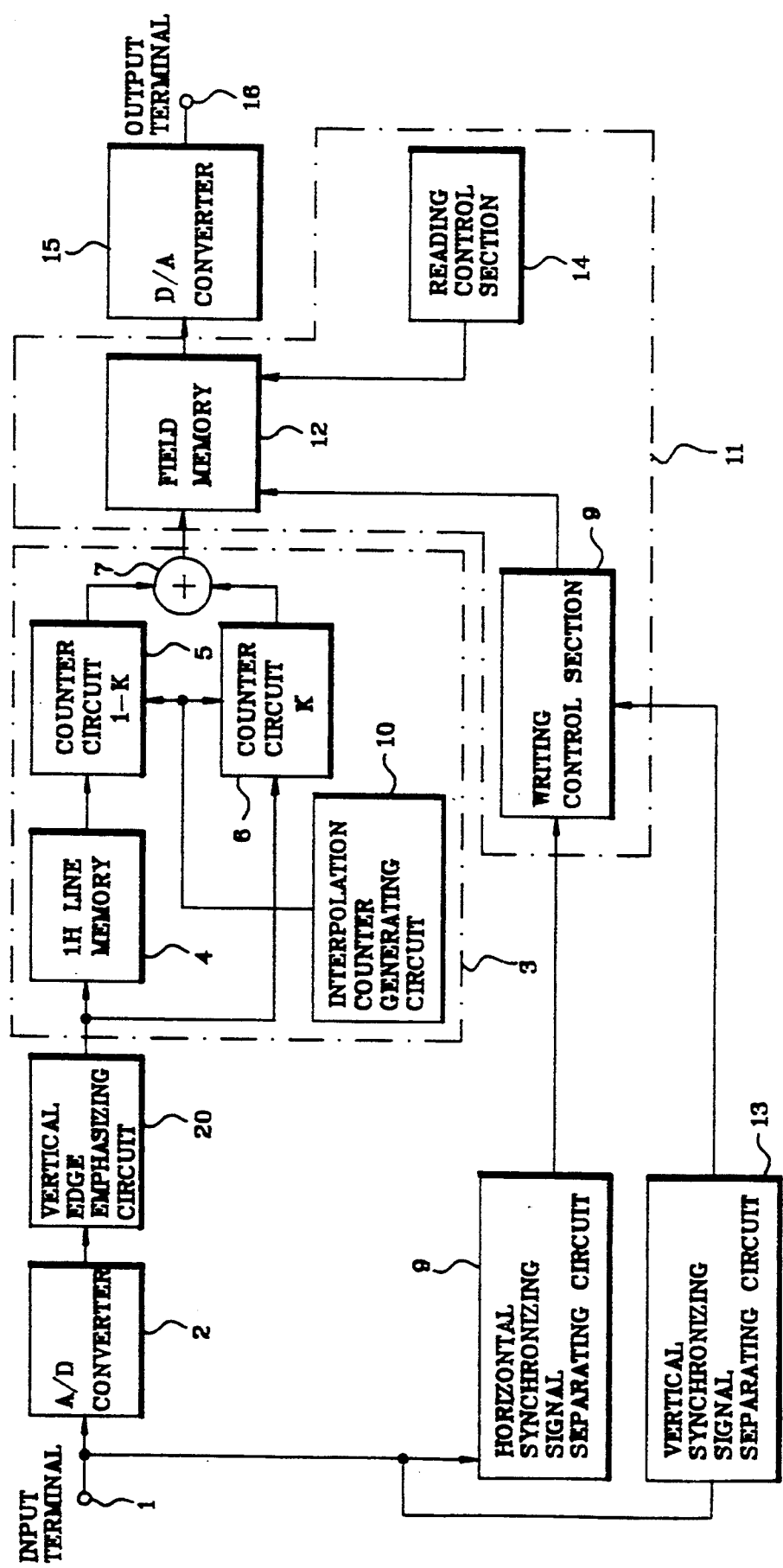
FIG. 1 is a block diagram of a conventional converting device of a television broadcasting mode.
Figure 2:
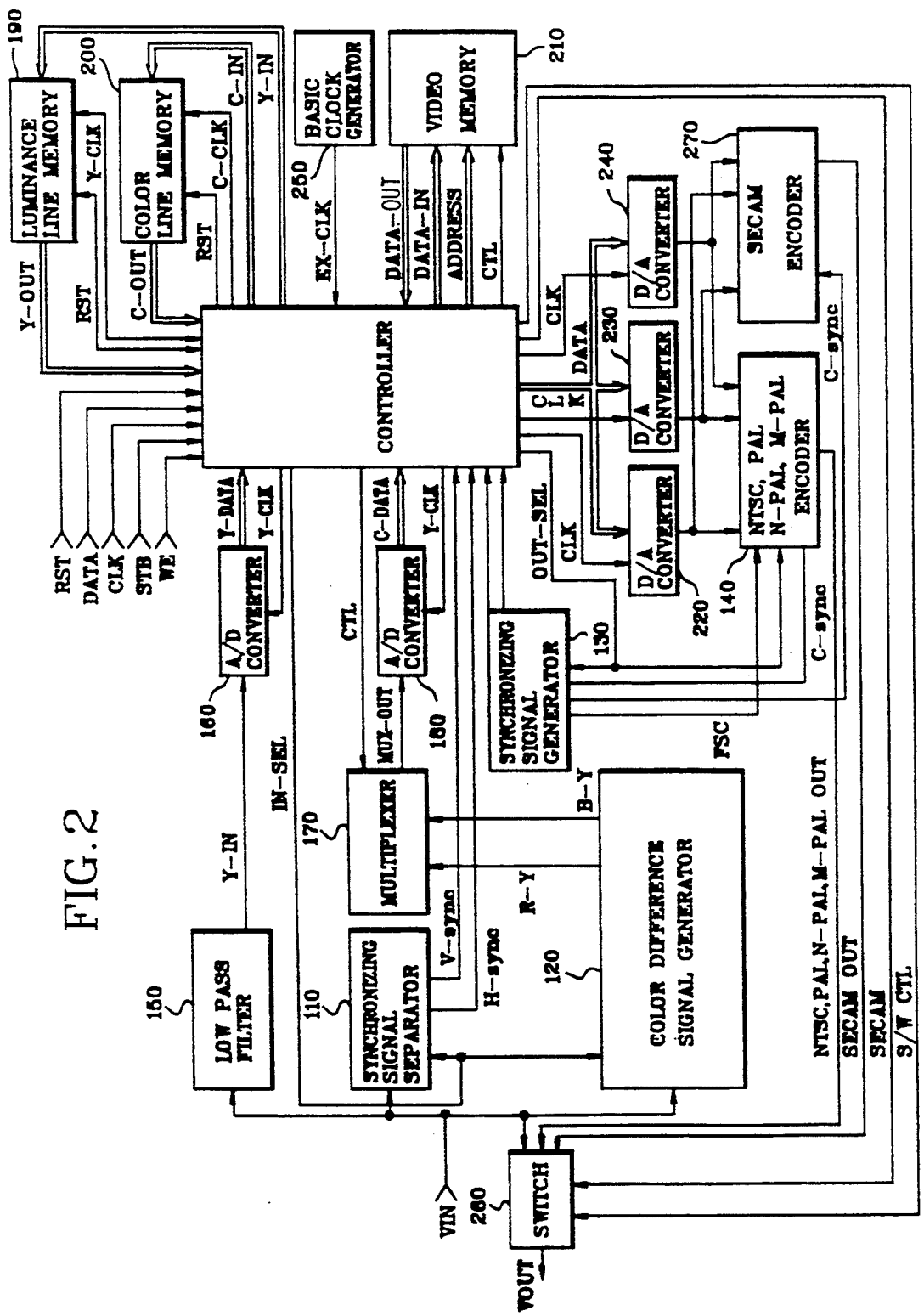
FIG. 2 is a block diagram of a converting device of a television broadcasting mode according to the present invention.

FIG. 2 is a block diagram of an automatic converting device of a television mode according to an embodiment of the present invention. As shown in FIG. 2, a low pass filter 150 which separates a luminance signal from an input television image signal is connected to an analog to digital converter 160 which converts the luminance signal into a digital signal.

A synchronizing signal separator 110 for separating a synchronizing signal from the image signal is connected to a color difference generator 120 for generating color signals R-Y and B-Y from the image signal.

A multiplexer 170 for mixing the color difference signals is connected to the color difference generator 120. A synchronizing signal generator 130 for generating a 4 fsc generating signal (fsc denotes a color subcarrier frequency and is set to 3.5795 MHz when in the NTSC mode) relative to a broadcasting mode is connected to the synchronizing signal separator 110.

A controller 100 for controlling the entire system is connected to a luminance line memory 190 and a color line memory 200 for respectively 1H delaying the luminance and color signals and is also connected to a basic clock generator 250 for generating a basic clock signal and a video memory 210 for compatibly converting different fields.

Several digital to analog converters 220, 230 and 240 for converting image data into the analog luminance signal and color difference signals are connected to the controller 100 and encoders 140 and 270 for encoding the broadcasting signals of NTSC, PAL, N-PAL, M-PAL and SECAM mode. A switch 260 is connected to the encoders 140 and 270 and the controller 100 for selectively providing the signals from the encoders 140 and 270 under a control of the controller 100.

An operation of the present invention thus constructed is initiated according to commands externally supplied through input side thereof. The commands are transferred through a reset line RST, a data line DATA, a clock lines CK and strobe line STB and include those which will be listed below. That is:

1) input NTSC
2) input PAL
3) input SECAM
4) input N-PAL
5) output M-PAL
6) output NTSC
7) output PAL
8) output SECAM
9) output N-PAL
10) output M-PAL
11) output TV-still (general still)
12) special playback (SLOW)
13) STROBO The device according to the present invention is operated as the commands representing the present input and the output are entered thereto.

If a PAL mode output in response to an NTSC input is required, then the commands denoting the input NTSC and the output PAL must be input to the device.

In digital effects such as TV-still, strobe and other, the TV-still is achieved by performing it with the input and output previously defined, and the strobe is effected by inputting the strobe command STROBO. And, a special playback such as a digital slow is effected by receiving a special playback command and a writing enable signal WE while being defined the input and output. The writing enable signal WE has a format as shown in FIG. 4 and is a synchronized with the writing enable signal WE when in the special playback (SLOW).

Figure 4:
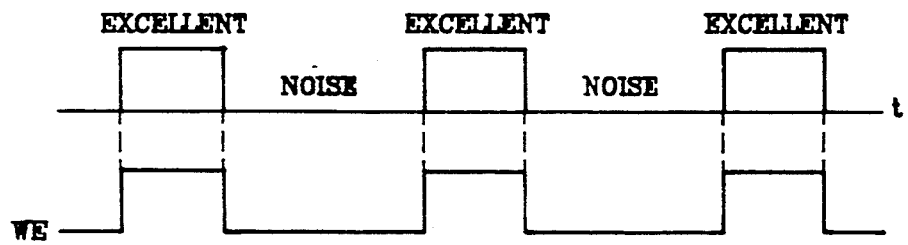
FIG. 4 is a waveform of a writing enable signal according to the present invention.

More specifically, the writing enable signal WE is in a high level (H) at a portion where the picture quality is excellent, while it is in a low level (L) at a portion where noise is presented, as shown in FIG. 4.

In fact, the device is in a special playback waiting state by receiving the input and output commands and then receiving the special playback command. At this time, if the writing enable signal WE becomes the high level, one field data is stored into the video memory 210 on the basis of a vertical synchronizing signal V-sync and a horizontal synchronizing signal H-sync and a reading operation is then continued.

If the writing enable signal WE becomes the high level again, then the previously described operation will be continuously effected by the device. Accordingly, a writing operation is effected with respect to the excellent picture image and the image having noise contained therein is substituted or replaced by the image having an excellent picture quality, thereby obtaining a slow image of an excellent picture quality.

A mode converting method according to the present invention will be described with reference to FIG. 2.

First, when receiving the video input and output commands, the controller 100 produces an input mode selecting signal IN-SEL to control the synchronizing signal separator 110 and the color difference signal generator 120 so as to select the input signal. The controller 100 produces an output mode selecting signal OUT-SEL to control the synchronizing signal generator 130 and the NTSC, PAL, N-PAL, M-PAL signal encoder 140, thereby selecting a broadcasting mode proper to the output signal.

Next, the video signal is entered through the video input terminal Vin. The synchronizing signal separator 2 separates the vertical synchronizing signal V-sync and horizontal synchronizing signal H-sync which, in turn, are supplied to the controller 100. The low pass filter 150 extracts the luminance signal Y-IN and supplies the analog luminance signal Y-IN to the controller 100 through the analog to digital converter 160.

The color difference signal generator 120 separates the color difference signals R-Y and B-Y from the video signal input, and supplies the color difference signals to the multiplexer 170.

The composite video signal is subjected to a color difference separation, a color system such as NTSC, PAL, SECAM is removed, but synchronizing systems V-sync and H-sync exist. In this case, the luminance signal is converted into the digital signal in accordance with the luminance clock signal Y-CKL generated by the controller 100 and the digitally converted signal is supplied to the controller 100. The color difference signals R-Y and B-Y are input to the analog to digital converter 180 through the multiplexer 170 operating in accordance with a control signal CTL transferred from the controller 100. At this time, the color analog to digital converter 180 receives the color clock signal C-CLK and then supplies the color signal data C-CATA to the controller 100.

The conversion sequence of the luminance signal Y-DATA and the color signal C-DATA to digital is effected by the analog to digital converters 160 and 180, and are determined differently depending upon the number of scanning lines, for example, 525 lines or 625 lines.

More specifically, if the PAL, SECAM or N-PAL signals having 625 scanning lines at 50 Hz frequency is converted into the NTSC or M-PAL signal having the 525 scanning lines at 60 Hz frequency, the signals from the analog to digital converters 160 and 180 are entered to the luminance line memory 190 and color line memory 200 through the controller 100 and then are stored into the video memory 210 under the control of the controller 100. The signals stored in the video memory 210 are supplied through the controller 100 to digital to analog converters 220, 230 and 240.

Alternatively, if the signal having 525 scanning lines is converted into the signal of 625 scanning lines, then the signal input from the analog to digital converters 160 and 180 is directly supplied to the video memory 210 and is entered to the digital to analog converters 220, 230 and 240 through the line memories 190 and 200.

The change of the conversion sequence allows the memory to be reduced in capacity because the video memory 210 always stores the signal of 525 lines. Substantially, the signals of a large number of scanning lines can be easily converted into a signal of a smaller number of scanning lines.

Figure 3:
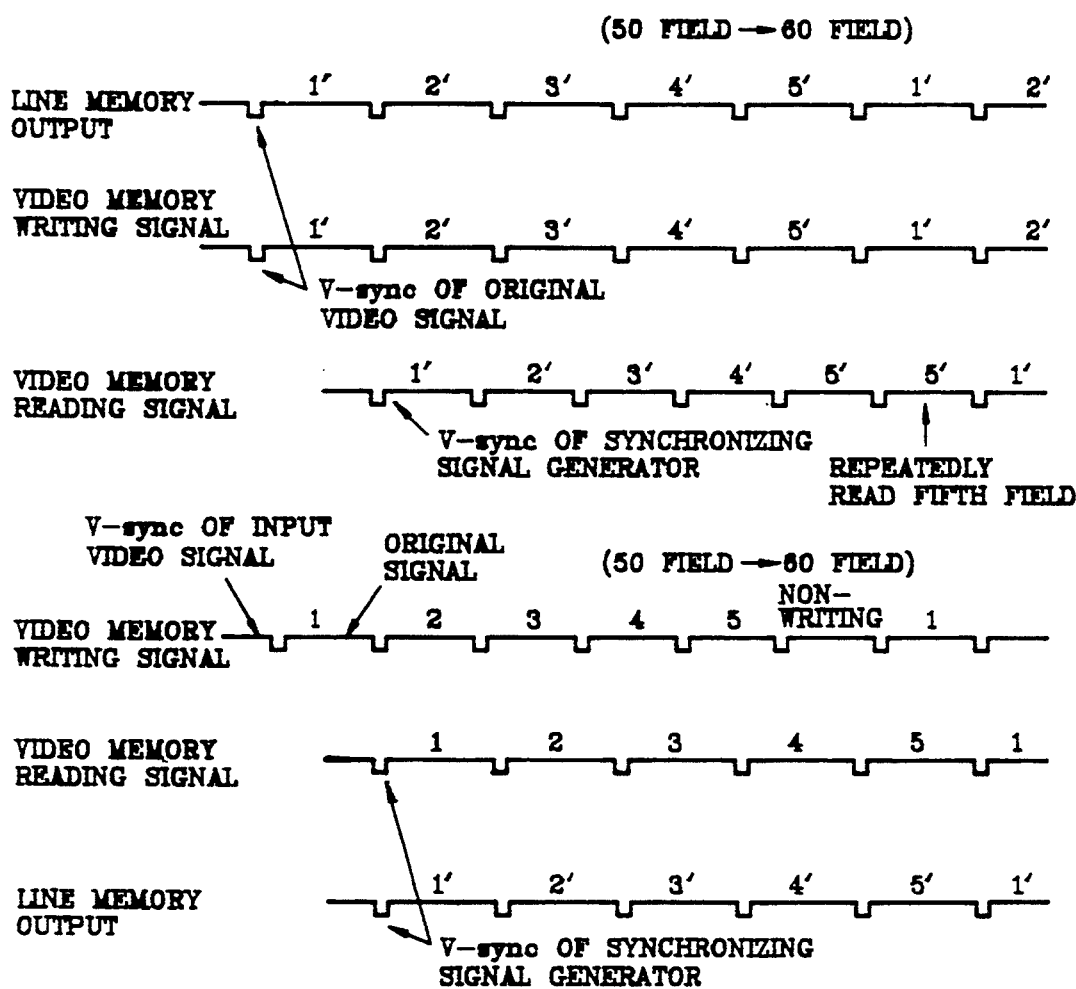
FIG. 3 are waveforms generated from main elements of FIG. 2.

In order to convert the 50 Hz signal (50 fields) into the 60 Hz signal (60 fields), it can be preferably achieved by compatibly converting a signal of five fields to a signal of six fields. That is, as shown in FIG. 3, when converting the 50 field signal to 60 field signal, 625 lines of the signal are converted into 525 lines by way of the line memories 190 and 200, and the 525 lines thus converted are written into the video memory 210 (the vertical synchronizing signal is equal to a synchronizing signal of an original video signal). On the contrary, the 60 field signal from the memories 190 and 200 is read in a synchronous relation with the synchronizing signal generator 130 which produces the 60 field synchronizing signals V-sync and H-sync. In the procedure of converting the signal of five fields into the signal of six fields, any one of the five fields is repeatedly read to obtain the six fields.

When converting the 60 field signals into 50 field signals, the last one of six fields of the original signal is skipped to produce the desired signal of five fields. The five field signal from the video memory 210 is read in a synchronous manner with the synchronizing signal generator 130 which produces the synchronizing signal in 50 fields. The signal thus read is converted into a signal having 625 lines by way of the line memories 190 and 200. The common applications in the previously described detail are that the six field periods of 60 field signal are substantially synchronized with the five field periods of 50 field signal and the video memory 210 is first written and then is read. In the line conversion described above, to convert the signal of 625 lines into the signal of 525 lines, the signal is converted in a ratio of 6:5 by way of a method as is described below.

525 lines $\xrightarrow{6/5 = 1.2}$ 625 lines

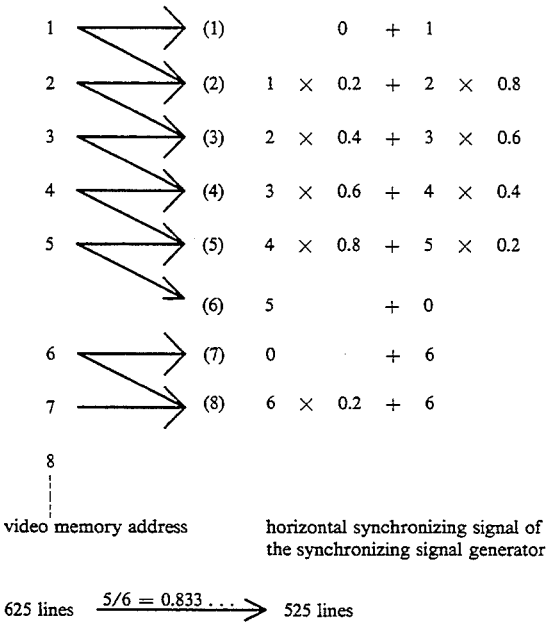

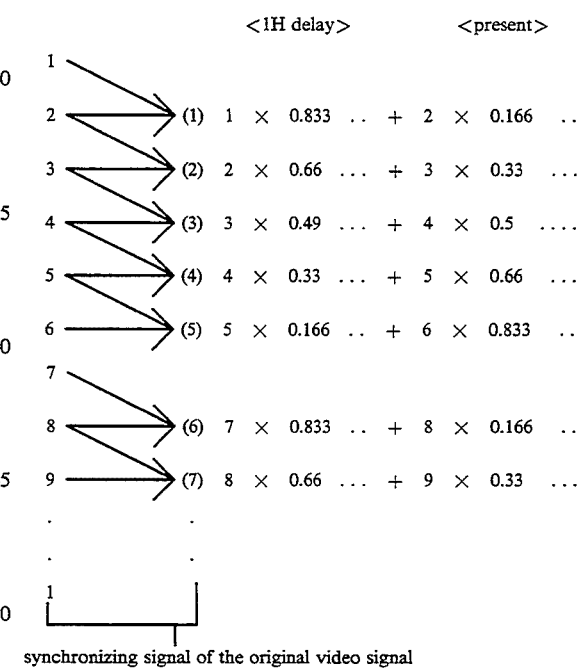

synchronizing signal of the original video signal

According to the line converting method as described above, the signal of 525 lines can be converted into a signal of 625 lines by way of an algorithm which applies a weighting value of 1.2 to any one of 525 lines and applies a percentage to the present signal and the signal 1H delayed by the line memories 190 and 200 in the signal of 625 lines to be converted, thereby producing one line. The signal of 525 lines is first stored and then is converted into a signal of 625 lines. Substantially, a portion changed from a fifth field to sixth field is discrete but a reading address for the memory 210 is 1H delayed so that the line conversion is able to be achieved effectively.

Alternatively, a signal of 625 lines can be converted into a signal of 525 lines by way of an algorithm in which a weighting value of 0.8333 is applied to any one of the 625 lines and a percentage is applied to the present signal and 1H signal of 525 lines, thereby producing one line.

When converting the signal of 625 lines into a signal of 525 lines, the original signal is immediately converted in line. The fifth line and sixth line are discrete, but it can be considered that the signal is continuously written in the video memory 210 by 1H delaying a writing address for the video memory 210.

The basic clock generator 250 supplies a basic clock EX-CLK to the controller 100 and the synchronizing signal generator 130 generates the 4 fsc signal in conforming to the broadcasting mode to produce synchronizing signal corresponding to the mode. The digital to analog converters 220, 230 and 240 supply the luminance signal Y and color difference signals R-Y and B-Y through data bus lines. The digital to analog converters 220, 230 and 240 separately employ the clock signals so as to reduce the number of signal I/O pins of the controller 100. The encoder 140 encodes the luminance signal Y and color difference signals R-Y and B-Y of the NTSC, PAL, N-PAL, M-PAL broadcasting modes and supplies the encoded results to the output switch 260. The encoder 270 encodes the luminance and color difference signals of SECAM broadcasting mode and supplies the encoded signals to the output switch 260. The video output Vout is selected by the switch 260.

As mentioned above, according to the present invention, since the television broadcasting modes can be compatibly converted, the video tape can be reproduced regardless the tape recording mode. Furthermore, the invention may be applied to all of the television mode softwares. The video memory practicable to store two fields is employed for standard television signal conversion without using a large number of the field memories. Accordingly, the device can be simply constructed in structure and the cost of manufacturing the device can be decreased.

Although the present invention has been described with respect to a specific example, it will be understood that various changes and modifications can be made therein without departing from the scope and spirit of the invention.

What is claimed is:

1. An automatic converting device of a television broadcasting mode comprising:
    a low pass filter for extracting a luminance signal from an input television video signal;
    a first analog to digital converter connected to the low pass filter, for converting the luminance signal into digital signals;
    a synchronizing signal separator for separating synchronizing signals from the video signal;
    a color difference signal generator connected to the synchronizing signal separator, for generating color difference signals from the video signal;
    a synchronizing signal generator connected to the synchronizing signal separator, for supplying a 4 fsc generating signal proper to the broadcasting mode and for generating a synchronizing signal;
    a multiplexer connected to the color difference signal generator, for mixing the color difference signals to provide a mixed color difference signal;
    a second analog to digital converter connected to the multiplexer, for converting the mixed color difference signal into a digital signal to produce color signal data;
    a controller for generating various control signals to control a switching device;
    a luminance line memory connected to said controller, for delaying the luminance signal by 1 horizontal period;
    a color line memory for delaying a color signal provided by said controller by 1 horizontal period;
    a basic clock generator connected to said controller, for generating a basic clock signal;
    a video memory, connected to the controller for receiving a field signal, and for compatibly converting the received field signal;
    a digital to analog converter connected to said controller, for converting image data corresponding to the converted field signal into an analog luminance signal and color difference signals;
    a first encoder connected to the digital to analog converter, for encoding one of NTSC, PAL, N-PAL and M-PAL broadcasting signals; and
    a second encoder connected to the digital to analog converter, for encoding an SECAM broadcasting signal;
    said switching device being connected to said controller and said first and second encoders, for selectively providing an output from one of said first and second encoders in accordance with said controller.

2. An automatic converting device of a television broadcasting mode comprising:
    means for extracting a luminance signal from an input television video signal;
    means for generating color signal data representing color difference signals from the input video signal;
    a controller, coupled to receive the luminance signal and the color signal data, and operable for generating control signals for controlling a switching device;
    means, coupled to said controller, for delaying the luminance signal and the color signal data by 1 horizontal period;
    a video memory, coupled to said controller, for compatibly converting different fields of the video signal; and
    an encoder circuit, coupled to receive luminance and color signal data corresponding to the converted video signal from said controller, for encoding the received data according to one of an NTSC, PAL, N-PAL, M-PAL and SECAM mode of broadcasting;
    said switching device being connected to said controller and said encoder circuit, for selectively providing the encoded data from said encoder circuit.

3. The automatic converting device according to claim 2, wherein said means for extracting the luminance signal comprises a low pass filter.

4. The automatic converting device according to claim 2, further comprising a synchronizing signal separator for separating synchronizing signals from the input video signal, and a synchronizing signal generator, connected to said synchronizing signal separator, for supplying a 4 fsc generating signal for a selected broadcasting mode and for generating a synchronizing signal.

5. The automatic converting device according to claim 2, wherein said means for delaying the luminance signals and the color signal data comprises a luminance line memory and a color line memory.

6. The automatic converting device according to claim 2, wherein said encoder circuit comprises a first encoder circuit for encoding received data from said controller according to one of an NTSC, PAL, N-PAL and M-PAL mode of broadcasting, and a second encoder circuit for encoding received data from said controller according to an SECAM mode of broadcasting.

7. The automatic converting device according to claim 6, further comprising a plurality of digital to analog converters coupled between said controller and said first and second encoder circuits.

8. The automatic converting device according to claim 2, wherein said means for generating color signal data comprises a color difference signal generator coupled to receive the input video signal, and wherein the switching device further comprises a multiplexer coupled to receive output signals from said color difference signal generator, and an analog to digital converter coupled between said multiplexer and said controller.

* * * * *